Nov. 6, 1945. W. J. JACOBSSON ET AL 2,388,327
TORCH
Filed April 16, 1941
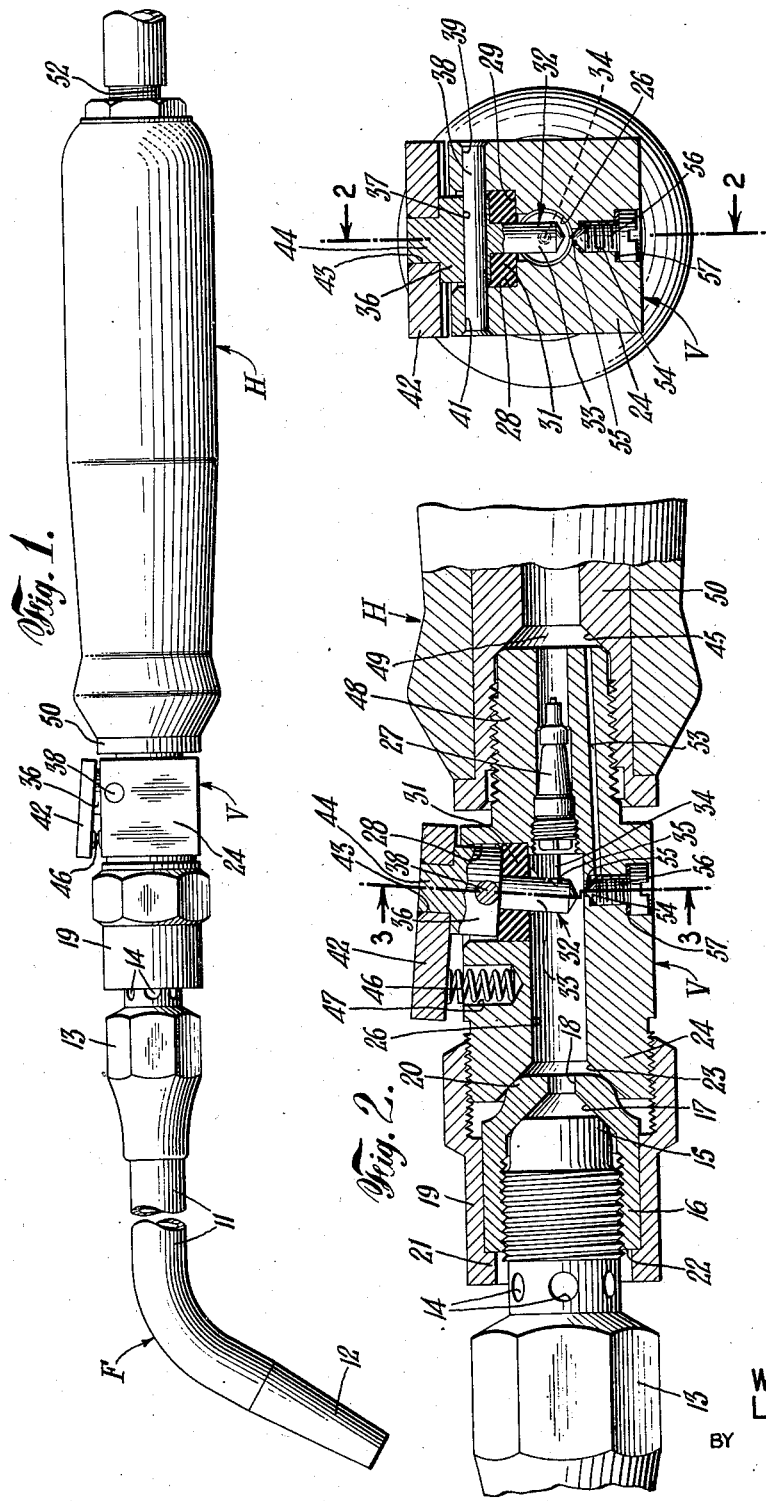
INVENTORS
WILGOT J. JACOBSSON
LLOYD W. YOUNG
BY
ATTORNEY Patented Nov. 6, 1945

2,388,327

UNITED STATES PATENT OFFICE 2,388,327

TORCH

Wilgot J. Jacobsson, Plainfield, and Lloyd W. Young, Scotch Plains, N. J., assignors to Union Carbide and Carbon Corporation, a corporation of New York Application April 16, 1941, Serial No. 388,782

1 Claim. (Cl. 251—134)

This invention relates to a torch, and particularly to a torch of the character wherein a flowing stream of gaseous acetylene aspirates air to produce a combustible gas mixture. The invention also concerns a novel quick-acting shut-off valve assembly for torches.

Quick-acting shut-off valves have been used for some time past in connection with oxy-acetylene welding and cutting blowtorches, but up until the present time no quick-acting shut-off valve for an air-acetylene torch has been available which is sufficiently dependable, yet simple and inexpensive in construction, to warrant its use with the simple and inexpensive torches of this type. The relatively high manufacturing cost of prior quick-acting shut-off valve constructions in blowtorches may be attributed in large part to the accurate machining and complicated construction required for sealing the operating mechanisms against gas leakage. Not only has it been desirable to develop a simple and inexpensive quick-acting shut-off valve construction for air-acetylene torches, but it has been almost imperative that such valves should be made available for the revision of already existing air-acetylene torches such, for example, as the torches shown in Patent No. 2,138,800 issued November 29, 1938, to L. W. Young.

The principal object of the present invention is to provide a torch with a simple and inexpensive, yet dependable and sturdy quick-acting shut-off valve. Still another object is the provision of a quick-acting shut-off valve assembly which may be applied to existing torches.

The above and other objects, and the novel features of the invention, will become apparent from the following description having reference to the annexed drawing, wherein:

Fig. 1 is a side elevational view of an air-acetylene torch embodying the principles of the invention;

Fig. 2 is an enlarged longitudinal sectional view, partly in elevation, of a part of the torch of Fig. 1 taken along the line 2—2 of Fig. 3; and Fig. 3 is a cross-sectional view taken approximately along the line 3—3 of Fig. 2.

The invention will be described hereinafter, by way of example only, as applied to an air-acetylene torch. It is to be understood, however, that the principles of the invention are applicable to other kinds of torches using other gases, as well as to use independently of a torch.

Generally, a torch constructed according to the principles of the invention comprises a front member F for conducting a combustible gas mixture, a quick-acting shut-off valve assembly V engaging the rear end of the front member, and a rear handle member H engaging the rear end of the valve assembly. The front member F and the rear handle member H are both independently separable from the valve assembly V and are adapted to be operatively assembled together if it is desired to use the torch without a valve body.

Valve assembly V includes a hollow body having an opening extending through the wall thereof to the outside of the body and an outwardly facing shoulder in the opening. A gas control valve device in the body has a stem normally in one position but movable in opposite directions to operate the device. A trigger which is located in the opening is pivotally mounted on the body on a fixed axis and has an inner end disposed inside the body in a position to push the valve stem in a direction to operate the valve upon application of pressure to the trigger. The trigger has a flange portion in the opening and an apertured sealing member of resilient material is disposed within the opening between and in contact with the flange portion and the outwardly facing shoulder. The sealing member has sealing surfaces sealingly engaging portions of the trigger and the wall of the opening, and acts, upon release of pressure from the trigger, to restore the trigger to its normal position and thereby release the valve stem to its normal position.

More specifically, the front member F comprises a combustible gas mixture conduit 11 having, for example, a goose-neck flame-producing tip 12 at its forward end, and an externally threaded male mixer body 13 at its rear end within which is an acetylene injector (not shown) adapted to discharge a stream of acetylene to aspirate air through the radial ports 14. A sleeve 16, which is threaded over the mixer body 13 and has a conical seating surface 17 abutting against the rounded rear end 15 of the mixer body, has a central passage 18 providing for access of acetylene to the mixer body 13. A coupling nut 19, having an inturned annular flange 21 on its front end engaging the shoulder or flange 22 provided by the front end of the sleeve 16, is threaded over the forward end of the body member 24 of the valve V and urges the rounded rear end 20 of the sleeve 16 against a conical seating surface 23 in the front of the valve body.

The valve body member 24 has a longitudinal passage 26 therethrough within which is removably threaded a valve unit 27 comprising a valve, a valve seat, and a valve spring urging the valve toward closed position. Valve units of the type ordinarily used in pneumatic tires may be used advantageously. A large diameter radial port 28 opens from the passage 26 to the outside of the body member 24 intermediate its ends, and is provided with an inwardly extending retaining shoulder 29 adjacent to its inner end. A disc-shaped member 31, of rubber or like resilient deformable material, fits snugly within the port 28 and rests upon the retaining shoulder 29. A cylindrical trigger 32 has a reduced diameter spindle 33 fitting snugly within and passing through a central hole in the member 31 for operating the valve unit 27. The spindle 33 has a small conical recess 35 adjacent to its inner end, within which the head of the valve stem 34 of the valve unit 27 is engaged. Immediately above the rubber member 31, the trigger 32 comprises a large diameter annular flange 36 which bears upon the upper surface of the rubber member. A lateral bore 37 through the flange 36 loosely carries a pivot pin 38 which is secured at its ends within the lateral bores 39 and 41 in the body 24 on opposite sides of the port 28, as by peening, and provides a fixed center about which the trigger 32 may oscillate. By this construction, the trigger 32 is pivoted on the pin 38 for rocking motion in a plane through the longitudinal aixs of the valve body 24, whereby the valve stem 34 may be actuated. A fluid-tight seal between the passage 26 and the atmosphere is provided by the rubber member 31, which is firmly wedged between the trigger 32 and the body 24 within the port 28. Moreover, actuation of the trigger 32 to open the valve 27 is opposed by the natural resiliency of the rubber member 31 so that, when pressure is relaxed from the trigger member, the rubber tends to restore the trigger to a neutral position such that the valve 27 is restored to its normally closed position.

A thumb lever 42 having a bore 43 is fitted over a boss 44 on the top of the trigger 32 and is welded or otherwise secured thereto. The lever 42 extends forwardly from the trigger 32 and adjacent to its forward end engages the top of a vertical spring 46 in a well 47 in the body member 24, which spring urges the lever and the trigger to a neutral position such that the valve 27 is maintained in normally closed position except when an operator depresses the lever.

The rear end of the valve body 24 comprises an externally threaded nipple 48 engaged within the internally threaded female portion or socket 49 of a long hollow handle bushing 50. In order to provide a gas-tight seal, the rear end of the nipple 48 is rounded and abuts against a conical seating surface 45 in the socket 49.

In operation, acetylene is supplied to the bushing 50 through an inlet 52 at the rear end of the handle H and, when the lever 42 is depressed, the valve 27 opens, permitting acetylene to pass freely forward through the passage 26 and the mixer body 13 to the front of the torch, where it may be ignited. When the flame no longer is desired the operator simply removes his hand from the lever 42, whereupon the valve 27 instantly closes in response to the spring action.

It is desirable that, when the torch is not being used continuously, a small pilot flame be maintained at the front of the torch so that, when the lever 42 is depressed by the operator, he will obtain a flame of the proper size and intensity instantaneously. For this purpose, the valve body 24 is provided with a small longitudinal passage 53 extending from the rear end of the valve body to a point ahead of the valve 27 where it is connected into the longitudinal passage 26 through a valve chamber 54 and a short duct 55. The quantity of gas by-passed through the passage 53 may be controlled by a small needle valve 56 in the valve chamber 54, which compresses an annular gasket 57 against the valve body to provide a seal.

When it is desired to use the torch without the quick-acting shut-off valve assembly V, the handle H may be unscrewed from the nipple 48, the coupling nut 19 may be unscrewed from the front of the body 24, and the sleeve 16 may be unscrewed from the mixer body 13. Thereafter, the male mixer body 13 may be threaded into the socket 49 at the front of the handle H to provide a complete and operable air-acetylene torch of the usual type.

Another advantage of the simple connections described in connection with Figs. 1 to 3 is that the goose-neck tip 12 may be turned about the longitudinal axis of the torch to any desired position with respect to the valve body V simply by loosening the coupling nut 19 slightly from the sleeve 16, turning the conduit 11 and tip 12 to the desired position, and again tightening the coupling nut 19 to produce a gas-tight seal.

The foregoing description has been by way of example only and it is to be understood that modifications of the construction specifically described may be made within the scope of the invention as defined by the claim appended hereto.

What is claimed is:

A hollow body having an opening extending through the wall thereof to the outside of said body, and an outwardly facing shoulder in said opening; a control device in said body having a stem normally in one position but movable in opposite directions to operate said device; a trigger in said opening pivotally mounted on said body on a fixed axis, said trigger having an inner end disposed inside said body in a position to push said stem in a direction to operate said device upon application of pressure to said trigger, said trigger having a flange portion in said opening; and an apertured sealing member of resilient material within said opening, between and in contact with said flange portion and said shoulder, said sealing member having sealing surfaces sealingly engaging portions of said trigger and the wall of said opening, said sealing member acting, upon release of pressure from said trigger, to restore said trigger to its normal position and thereby release said stem to its normal position.

WILGOT J. JACOBSSON.
LLOYD W. YOUNG.